United States Patent [19]

Itoh et al.

[11] 4,178,044
[45] Dec. 11, 1979

[54] BRAKE MECHANISM FOR TRACTORS

[75] Inventors: Yuzuru Itoh; Masaaki Ichimura, both of Kawasaki; Masaru Uenoyama, Ayase, all of Japan

[73] Assignee: Kabushiki Kaisha Komatsu Seisakusho, Tokyo, Japan

[21] Appl. No.: 924,374

[22] Filed: Jul. 13, 1978

[30] Foreign Application Priority Data

Jul. 15, 1977 [JP] Japan ................................. 52/93436

[51] Int. Cl.² .............................................. B60T 15/46
[52] U.S. Cl. ................................................ 303/47; 303/8
[58] Field of Search .................... 303/7, 8, 9, 47, 64, 303/80

[56] References Cited
U.S. PATENT DOCUMENTS

| | | |
|---|---|---|
| 3,819,238 | 6/1974 | Cermak ................................. 303/47 |
| 3,992,064 | 11/1976 | Carton et al. .......................... 303/7 |
| 4,049,324 | 9/1977 | Cermak ............................. 303/47 X |

*Primary Examiner*—Duane A. Reger
*Attorney, Agent, or Firm*—Armstrong, Nikaido, Marmelstein & Kubovcik

[57] ABSTRACT

A brake mechanism for a tractor comprising an air tank containing compressed air, a brake valve connected to said air tank, a brake pedal operatively connected to said brake valve, a pair of solenoid operated selector valves, a pair of throttle valves each being connected to said one of the selector valves, respectively, a pair of double check valves each being connected to said one of the selector valves at one end thereof, the other end of which being connected to said one of the throttle valves, respectively, two pairs of brake chambers each being connected to one of said double check valves, respectively, and a switch connected to said selector valves.

4 Claims, 2 Drawing Figures

BRAKE MECHANISM FOR TRACTORS

BACKGROUND OF THE INVENTION

This invention relates to a braking mechanism for use in tractors.

The braking device for conventional tractors, in particular for tractors operated within a compound is constructed as shown in FIG. 1 so that when a brake pedal "b" mounted on the tractor "a" is depressed the compressed air from air tanks "g" is supplied into front brake chambers "c" and "d" and rear brake chambers "e" and "f" and at the same time the compressed air from the air tank on the side of the tractor "a" is supplied through a relay emergency valve "k" into brake chambers "i" and "j" on the side of the trailer "h" thereby effecting respective braking operations.

In the above-mentioned prior art braking mechanism, however, the brake mounted on the tractor "a" can be actuated immediately by stepping down the pedal "b", but a considerable time lag is required until the brake mounted on the trailer "h" is actuated because of a long brake pipeline extending to it. Since, in particular under loaded condition, the deceleration speed is relatively reduced, the braking operation of the trailer "h" cannot be matched satisfactorily that of the tractor "a" so that when sudden braking operation is made the portion connecting the tractor "a" and the trailer "h" tends to be damaged or bent; in other words, what is called jack knife phenomenon tends to occur.

SUMMARY OF THE INVENTION

It is therefore an object of the present invention to provide a brake mechanism for a tractor which can prevent bending of connecting portions of the tractor and a trailer to be towed thereby.

Another object of the present invention is to provide a brake mechanism for a tractor wherein means is provided in the brake mechanism for causing a time lag in the braking of the tractor thereby preventing the connecting portions of the tractor and the trailer to be towed from being jackknifed.

In accordance with an aspect of the present invention, there is provided a brake mechanism for a tractor which comprises an air tank containing compressed air therein, brake valve means connected to said air tank, a brake pedal operatively connected to said brake valve, a pair of selector valve means connected to said brake valve means, each of said selector valve means having two positions to be changed over, a pair of throttle valve means each being connected to one of the outlet ports of said one of the selector valve means, respectively, a pair of double check valve means each being connected to another outlet port of one of said selector valve means at one end thereof, the other end of which being connected to one of said throttle valve means, respectively, two pairs of brake chambers each being connected to one of said double check valve means, respectively, and switch means connected to said selector valve means for changing over the positions thereof.

Since a pair of throttle valve means are provided in the braking system, when it is required to cause a time lag in the braking of the tractor while towing a trailer, the compressed air is supplied from said air tank into said brake chambers through said throttle valve means by changing over said selector valve means to a position connecting said air tank with said brake chambers via said throttle valve means.

When the tractor is operated alone, said selector valve means are changed over to a position connecting said air tank directly with said brake chambers without passing through said throttle valve means.

The above and other objects, features and advantages of the present invention will be readily apparent from the following description taken in conjunction with the accompanying drawings.

DETAILED DESCRIPTION OF THE INVENTION

The present invention will now be described in detail with reference to the accompanying drawing.

Figure 1:
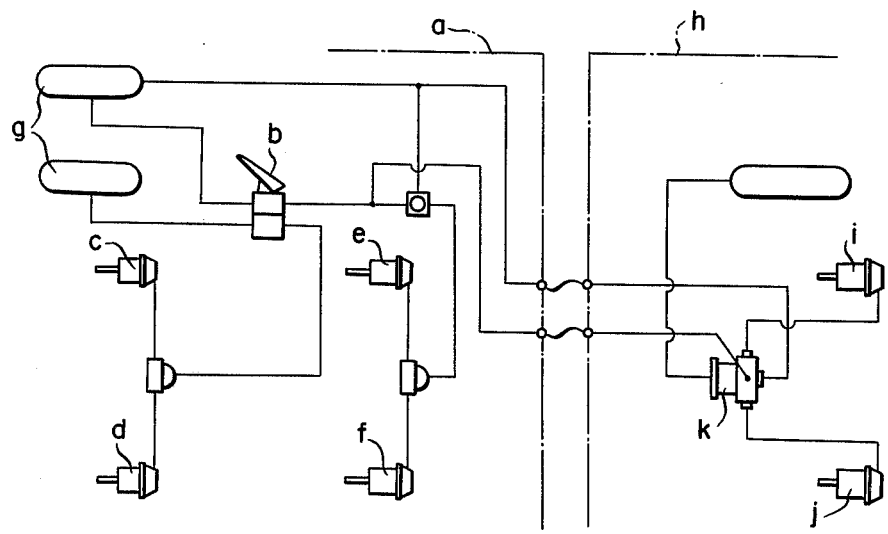
FIG. 1 is one of conventional circuits for a braking system of a tractor.
Figure 2:
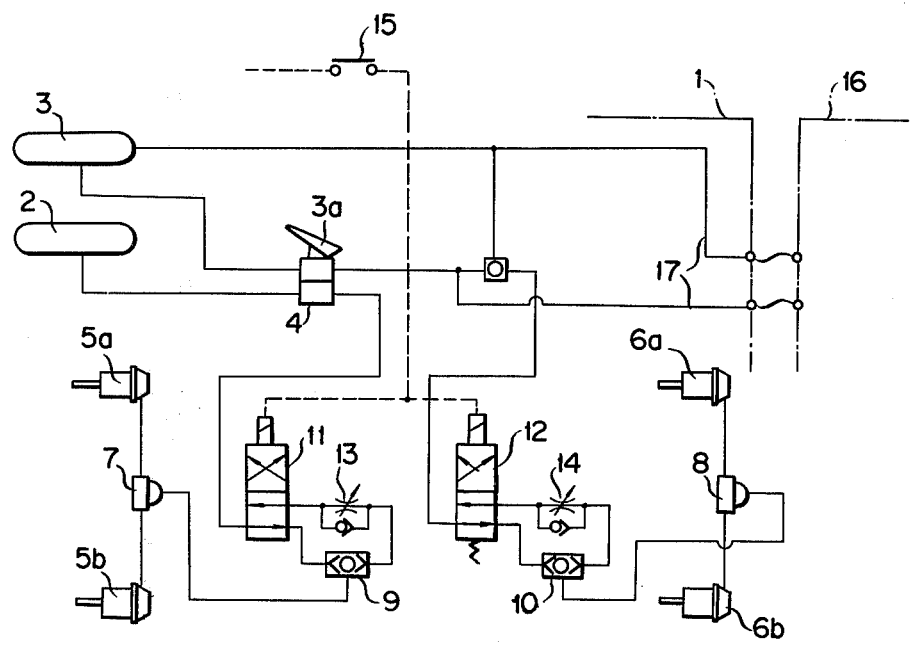
FIG. 2 is a braking circuit for a tractor according to the present invention.

In FIG. 2, reference numeral 1 denotes a tractor, 2 and 3 air tanks, 3a a brake pedal, 4 front and rear brake valves, 5a and 5b front brake chambers on the left and right sides, and 6a and 6b rear brake chambers on the left and right sides. The brake chambers 5a, 5b and 6a, 6b are connected to quick release valves 7 and 8, respectively. The quick release valves 7 and 8 are connected to double check valves 9 and 10, respectively. Reference numerals 11 and 12 denote selector valves each having four ports and two positions or normal and offset positions and being adapted to be changed over by a solenoid when energized. Each of the selector valves 11 and 12 has a primary port connected to the brake valve 4 and secondary ports, one of which is directly connected to one of ports of double check valves 9 and 10, respectively, the other of which is connected through either of variable throttle valves 13 and 14 to the other of the ports of the double check valves 9 and 10, respectively. Reference numeral 15 denotes a switch for changing over the abovementioned selector valves 11 and 12. Reference numeral 16 denotes a trailer, and 17 a brake pipeline connected to a braking means (not shown) on the side of the trailer 16.

In the above-mentioned arrangement, when the brake valve 4 is actuated with the solenoid operated selector valves 11 and 12 kept at their normal positions by means of the switch 15, the compressed air from the air tanks 2 and 3 acts directly on the double check valves 9 and 10 and then on the front brake chambers on the left and right sides 5a, 5b and the rear brake chambers on the left and right sides 6a, 6b so that the braking operation can be effected in the conventional or well-known manner.

Further, when the brake valve 4 is actuated with the solenoid valves 11 and 12 kept at their offset positions, the compressed air acts through the variable throttle valves 13 and 14 on the double check valves 9 and 10 and thence on the brake chambers 5a, 5b, 6a and 6b. The compressed air exerted on the brake chambers is throttled by the above-mentioned variable throttle valves 13 and 14 so that a time lag is caused in the braking operation by an amount corresponding to the amount of throttle.

Thus, when the tractor 1 is connected to the trailer 16, the solenoid operated selector valves 11 and 12 are changed over to their offset positions so that a time lag can be caused in the braking of the tractor 1. By so doing, the braking operation of the tractor 1 and the trailer 16 can be synchronized with each other thereby eliminating the occurrence of the "jack knife phenomenon". The degree of the time lag in the braking of the tractor 1 can be synchronized with the time lag in the braking of the trailer 16 by regulating the variable throttle valves 13 and 14. Further, the time lag is not always caused only by the variable throttle valves 13 and 14, and it may be caused by means of fixed throttle valves if the time lag in the braking of the trailer 16 is kept constant. Furthermore, the selector valves 11 and 12 may be actuated pneumatically or manually without being limited to the actuation by solenoid.

When it is desired to operate the tractor 1 alone, the selector valves 11 and 12 are set at their normal positions so that the compressed air from the air tanks can act directly on the double check valves 9 and 10.

As mentioned above, according to the present invention, the braking means of the tractor comprises a circuit connecting directly the brake chambers 5a, 5b, 6a and 6b of the tractor 1 and the brake valve 4, and another circuit through the throttle valves, the arrangement being made such that said two circuits can be changed over to each other. Therefore, when the trailer 16 is towed by the tractor 1, the compressed air from the air tanks can be exerted on the brake chambers through the circuits extending through the throttle valves thereby causing a time lag in the actuation of the brake so that the "jack knife phenomenon" can be eliminated to ensure safe operation.

While the invention has been described and shown with particular reference to the preferred embodiment, it will be apparent that variations might be possible that would fall within the scope of the present invention, which is not intended to be limited except as defined in the following claims.

What is claimed is

1. A brake mechanism for a tractor comprising an air tank containing compressed air therein, brake valve means connected to said air tank, a brake pedal operatively connected to said brake valve, a pair of selector valve means connected to said brake valve means, each of said selector valve means having two positions, a pair of throttle valve means each being connected to one of the outlet ports of said one of the selector valve means, respectively, a pair of double check valve means each being connected to another outlet port of one of said selector valve means at one end thereof, the other end of which being connected to one of said throttle valve means, respectively, two pairs of brake chambers each being connected to one of said double check valve means, respectively, and switch means connected to said selector valve means for changing over the positions thereof.

2. A brake mechanism for a tractor as defined in claim 1 wherein said selector valve means is solenoid operated selector valve.

3. A brake mechanism for a tractor as defined in claim 1 or 2 wherein said throttle valve means is variable type.

4. A brake mechanism for a tractor as defined in claim 1 or 2 further comprising a pair of quick release valve means, each being connected to one of the pairs of said brake chambers and to one of said double check valves, respectively.

* * * * *